United States Patent [19]
Shieh et al.

[11] Patent Number: 6,124,952
[45] Date of Patent: *Sep. 26, 2000

[54] MAGNIFICATION-VARIABLE OPTICAL SCANNER

[75] Inventors: Han-Ping Shieh; Jinn-Chou Yoo, both of Hsinchu; Der-Rong Hsu, Taipei Hsien; Chong-Min Chang, Taipei, all of Taiwan

[73] Assignee: Acer Peripherals, Inc., Taiwan

[*] Notice: This patent issued on a continued prosecution application filed under 37 CFR 1.53(d), and is subject to the twenty year patent term provisions of 35 U.S.C. 154(a)(2).

[21] Appl. No.: 09/038,276

[22] Filed: Mar. 11, 1998

[30] Foreign Application Priority Data

Jun. 27, 1997 [TW] Taiwan ................................ 86210691

[51] Int. Cl.$^7$ .............................. G06B 26/08; H04N 1/04
[52] U.S. Cl. ........................... 358/475; 358/474; 359/381
[58] Field of Search ..................... 358/474, 475, 358/497, 494; 359/381, 379, 391

[56] References Cited

U.S. PATENT DOCUMENTS

| | | | |
|---|---|---|---|
| 4,946,265 | 8/1990 | Shimizu et al. | 359/381 |
| 5,117,256 | 5/1992 | Haibara | 355/77 |
| 5,535,040 | 7/1996 | Ohtsuka et al. | 359/210 |
| 5,633,745 | 5/1997 | Chen et al. | 359/201 |
| 5,844,697 | 12/1998 | Omvik et al. | 358/487 |
| 5,845,019 | 12/1998 | Yoshizawa et al. | 358/474 |

*Primary Examiner*—Jerome Grant, II
*Attorney, Agent, or Firm*—Pillsbury Madison & Sutro LLP

[57] ABSTRACT

A magnification-variation scanner modifies the resolution merely by changing the object distance and the image distance, with a constant focal distance. The scanner includes a light source, an object lens, an image detector, a holder for carrying the object lens, an optical path delay and a driver. The optical path delay can be located at the midway of the light path from the light source to the object lens, thereby modifying the optical path between the object surface and the object lens. In accompaniment with the movement of the object lens, the dimensions of the image projected over the image detector can be modified. The resolution can therefore be modified. The driver connects between the holder and the optical path delay. As the movements of the holder and the optical path delay are controlled by the driver, the optical path from the object surface to the object lens and that from the object lens to the image detector can be modified according to the equations of $$l' = f'(1 - M),$$

$$l = f'\left(1 - \frac{1}{M}\right)$$

and $$T = l + l' = f'\left(2 - \frac{1}{M} - M\right).$$

6 Claims, 5 Drawing Sheets

MAGNIFICATION-VARIABLE OPTICAL SCANNER

BACKGROUND OF THE INVENTION

1. Field of the Invention

This invention relates to an optical scanner, and more specifically, to a magnification-variable optical scanner in which two-stage, multi-stage or continuous variation is available.

2. Description of Related Art

The demand for multimedia information has become remarkable with the recent development of information technology. Therefore, pictures are required in some documents which in the past were text-only documents. In order to satisfy the demand for large amounts of image data, a picture catcher is generally utilized as a data input device. The optical scanner has recently become one of the foremost picture catchers because of its performance and price. However, the scan quality of the optical scanner has some limitations. The resolution, which is requested at first when an optical scanner is considered, is determined by an image detector therein. In general, the image detector is a charge-coupled device (CCD).

When the object surface of a specific area is scanned, a CCD device with a sufficient number of pixels is required to satisfy the resolution requirement. Therefore, more CCD pixels are necessary for a higher scan resolution. However, more CCD pixels result in higher costs and longer scanning time. The resolution can also be improved by changing the magnification. But although the scanning time is unchanged, the scanned area is reduced, that is, the object surface becomes smaller. However, in view of costs, most conventional systems change the magnification to improve the resolution from, for example, 600 dpi to 1200 dpi.

The magnification of a conventional optical system is modified, in general, by a zoom lens. The zoom lens is difficult to design and has a very complicated structure. Therefore the optical system has difficulties in modifying its magnification by the zoom lens, and manufacturing costs are higher.

SUMMARY OF THE INVENTION

Accordingly, the present invention provides an optical scanner system in which the system focal distance is invariable, while the object distance and image distance are modified to change the magnification, thereby changing the resolution.

In the present invention, the optical path between a scanned object and an object lens and that between the object lens and a CCD device are modified to change the magnification of the optical scanner system, thereby changing the resolution. The principal concept of the invention can further be developed to a two-step, multi-step or successive magnification-variable optical scanner system.

The principle of the invention will be explained in accompaniment with FIG. 1. Referring to FIG. 1, a lens (or a lens set) 1 has a focal distance f', an object distance l, and an image distance l'. According to first-order optics, i.e., Gaussian optics, we have $$\frac{1}{l'} - \frac{1}{l} = \frac{1}{f'}.$$

Supposing $$M = \frac{l'}{l},$$

the relation becomes $$1 - M = \frac{l'}{f'}.$$

Therefore, $$l' = f'(1 - M), \quad (1)$$

$$l = f'\left(1 - \frac{1}{M}\right) \quad (2)$$

and $$T = l + l' = f'\left(2 - \frac{1}{M} - M\right). \quad (3)$$

Differentiating Eq. (1), (2) and (3) by M, we have $$dl' = -f' dM,$$

$$dl = f'\frac{dM}{M^2}$$

and $$dT = -f'\left(1 - \frac{1}{M^2}\right) dM.$$

These equations reveal that, if the focal distance f' of lens 1 is fixed, M can be gradually modified by changing l and l', thereby achieving the objects of the invention.

DETAILED DESCRIPTION OF THE INVENTION

Figure 1:
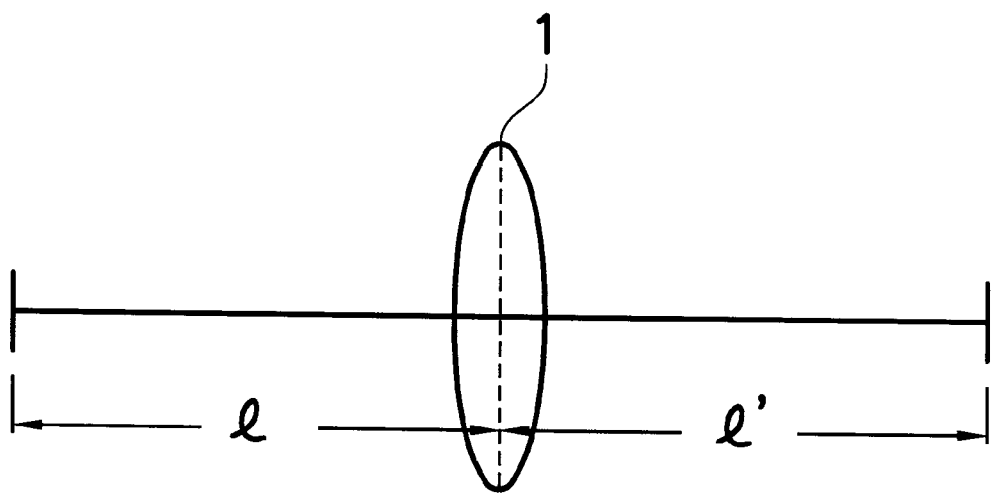
FIG. 1 is a schematic diagram of a simple image formation system.

Referring to FIG. 2, a first embodiment of the invention includes a light source 10 which provides light for scanning an object surface 5, an object lens 15 for forming an image with rays reflected from the object surface 5, an image detector 20, which is a CCD device, for receiving the image projected thereon from the object lens 15, a holder 25 for carrying the object lens 15, an optical path delay 30 and a driver 35. The optical path delay 30 can be located at the midway of the light path from the light source 10 to the object lens 15, thereby modifying the optical path between the object surface 5 and the object lens 15. In accompaniment with the movement of the object lens 15, the dimensions of the image projected over the image detector can be modified, thereby changing the resolution. The driver 35 connects both the holder 25 and the optical path delay 30. As the movements of the holder 25 and the optical path delay 30 are controlled by the driver 35, the optical path from the object surface 5 to the object lens 15 and that from the object lens 15 to the image detector 20 can be modified simultaneously.

Figure 2A:
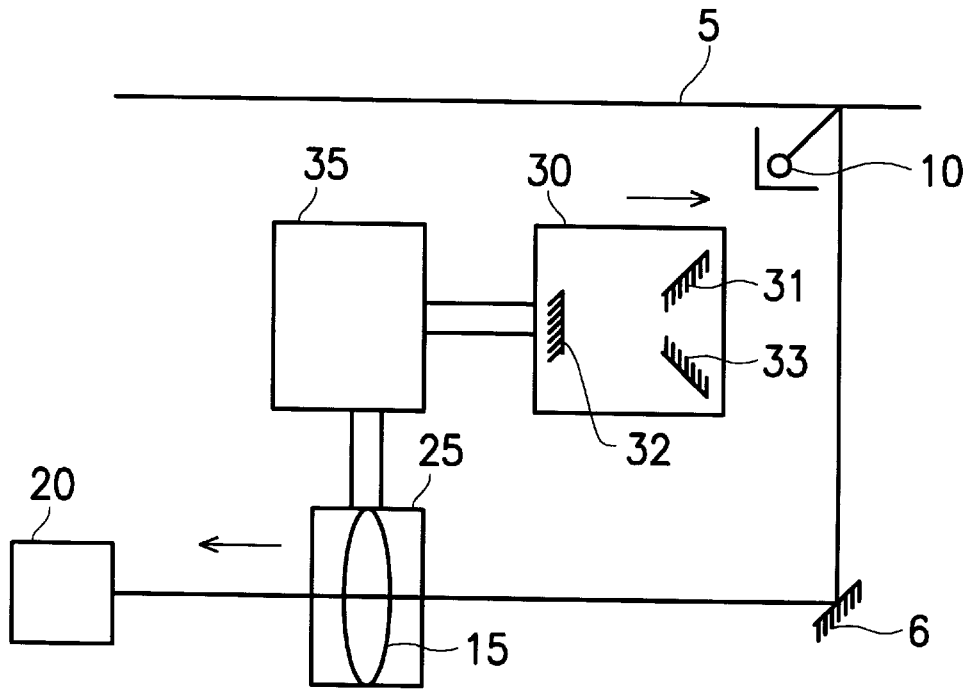
FIG. 2A is a schematic diagram illustrating the structure of a preferred embodiment of the invention.
Figure 2B:
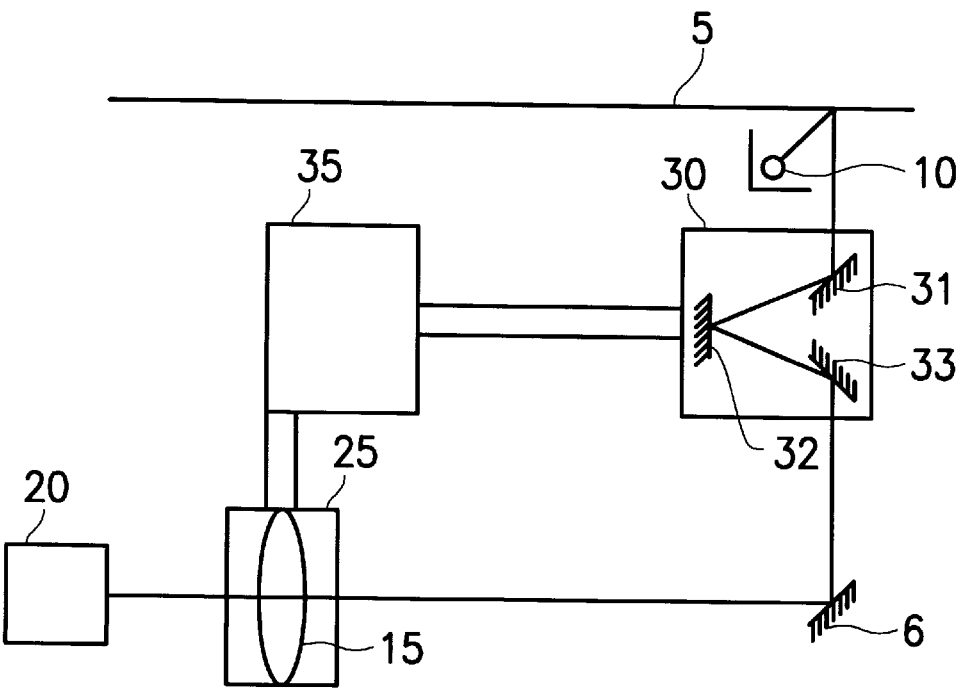
FIG. 2B is a schematic diagram illustrating the structure of the preferred embodiment when the resolution is changed.

The scanner of the embodiment provides the possibility of scanning image in two resolutions, for example 600 dpi and 1200 dpi. That is, the embodiment is an application of a two-step magnification-variation scanner. Referring to FIG. 2A, since the optical path delay 30 is away from the light path, the object lens 15 is in a predetermined position, and the resolution of the scanner is 1200 dpi. Referring to FIG. 2B, when the driver 35 moves the optical path delay 30 to the midway of the light path, and moves the object lens 15 toward the image detector 20 to another predetermined position, the optical path from the object surface 5 to the object lens 15 is greatly extended, thereby switching the resolution of the scanner from 1200 dpi to 600 dpi. As the driver 35 moves the optical path delay 30 and object lens 15 only between two predetermined positions, it can be a step motor with certain mechanical elements or simply some mechanical parts. Since the structure of the driver is well known to those skilled in the art, its description is omitted.

The optical path delay 30 of the embodiment includes three reflective lens 31, 32 and 33. Referring to FIGS. 2A and 2B, when the optical path delay 30 is located at the midway of the light path, a longer optical path is provided. The reflective lens 6 is provided for changing the orientation of the light path.

Although the two-step magnification-variation scanner of the embodiment changes the object lens and the optical path delay between two predetermined positions, the optical path from the object surface 5 to the object lens 15 and that from the object lens 15 to the image detector 20 still conform with the following equations to make the image correctly form on the image detector 20:

$$l' = f'(1 - M),\quad(1)$$

$$l = f'\left(1 - \frac{1}{M}\right) \text{ and}\quad(2)$$

$$T = l + l' = f'\left(2 - \frac{1}{M} - M\right),\quad(3)$$

wherein T is total distance from the object surface to the image detector, object distance l is optical path from the object surface to the object lens, image distance l' is optical path from the object lens to the image detector, f' is focal distance and M is the magnification ratio.

In the embodiment, the lens 15 can be a lens set which has a constant focal distance of about 43.9 mm. For a scanner with resolution switching between 600 dpi and 1200 dpi, it has the characteristics as follows:

| Resolution (dpi) | Magnification | Total Distance (mm) | Object Distance (mm) | Aperture Angle | Field Angle |
|---|---|---|---|---|---|
| 600 | −0.16535 | 360 | 51 | 0.73° | 19.3° |
| 1200 | −0.3307 | 234.7 | 58 | 1.27° | 17.1° |

Figure 3:
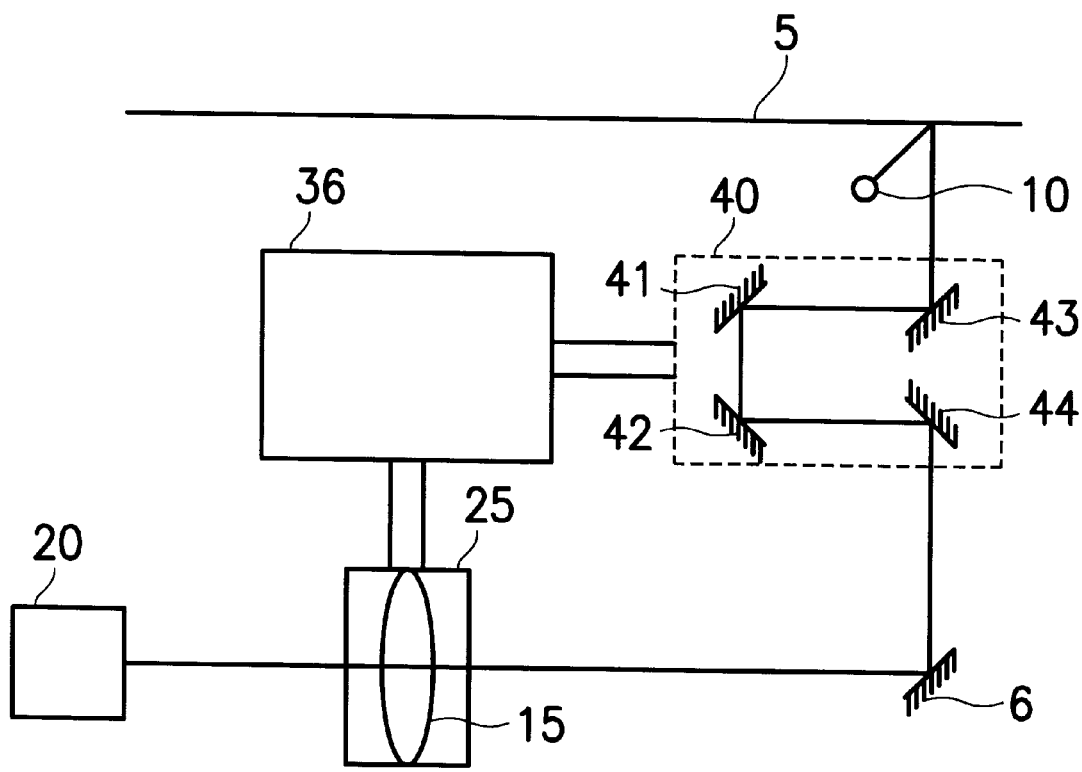
FIG. 3 is a schematic diagram illustrating the structure of another embodiment of the invention.

Referring to FIG. 3, a second embodiment of the invention includes a light source 10 which provides light for scanning an object surface 5, an object lens 15 for forming an image with rays reflected from the object surface 5, an image detector 20 for receiving the image projected thereon from the object lens 15, a holder 25 for carrying the object lens 15, an optical path delay 40 and a driver 36. The optical path delay 40 is at the midway of the light path from the light source 10 to the object lens 15, thereby modifying the optical path between the object surface 5 and the object lens 15. In accompaniment with the movement of the object lens 15, the dimensions of the image projected over the image detector can be modified, thereby changing the resolution. The driver 36 connects both the holder 25 and the optical path delay 40. As the movements of the holder 25 and the optical path delay 40 are controlled by the driver 36, the optical path from the object surface 5 to the object lens 15 and that from the object lens 15 to the image detector 20 can be modified simultaneously according to equation (1), (2) and (3).

The scanner of the embodiment can perform scanning operation in successive resolution variations. The driver includes motor, gear sets and guide pipes, which are well known to those skilled in the art. However, since the optical path between the object lens 15 and the image detector 20 is determined by the movement of the object lens 15, and the optical path between the object surface and the object lens is determined by the movement of the optical path delay, the guide pipe must be designed such that the movements of the object lens 15 and the optical path delay should also satisfy the following equations:

$$dl' = -f'dM,\quad(4)$$

$$dl = f'\frac{dM}{M^2} \text{ and}\quad(5)$$

$$dT = -f'\left(1 - \frac{1}{M^2}\right)dM,\quad(6)$$

wherein dT is a small variation in total distance from the object surface to the image detector, dl is a small variation in the optical path from the object surface to the object lens, and dl' is a small variation in the optical path from the object lens to the image detector.

Referring to FIG. 3, the optical path delay 40 of the embodiment includes four reflective lens 41, 42, 43 and 44, wherein the lens 43 and 44 are fixed, whereas lens 41 and 42 are movable. Therefore, when the driver 36 drives the optical path delay 40, the lens 41 and 42 change their positions to modify the optical path.

In both the aforementioned first and second embodiments, the holder and the optical path delay are arranged over railways so that they can be moved steadily.

In the second embodiments, if using the same lens set of embodiment 1, when the resolution is 600 dpi, and the total distance of the optical path from the object surface 5 to the image detector 20 is 360 mm, the magnification would be −0.16535, the image distance is 51 mm, the aperture angle is 0.73°, and the field angle is 19.3°. Other specifications when resolution is switched to 1200 dpi, 1800 dpi and 2400 dpi are shown respectively in the following table.

| Resolution (dpi) | Magnification | Total Distance (mm) | Object Distance (mm) | Aperture Angle | Field Angle |
|---|---|---|---|---|---|
| 600 | −0.16535 | 360 | 51 | 0.73° | 19.3° |
| 1200 | −0.3307 | 234.7 | 58 | 1.27° | 17.1° |
| 1800 | −0.49605 | 197.8 | 65.57 | 1.69° | 15.23° |
| 2400 | −0.6614 | 183 | 72.82 | 2.03° | 13.78° |

Figure 4A:
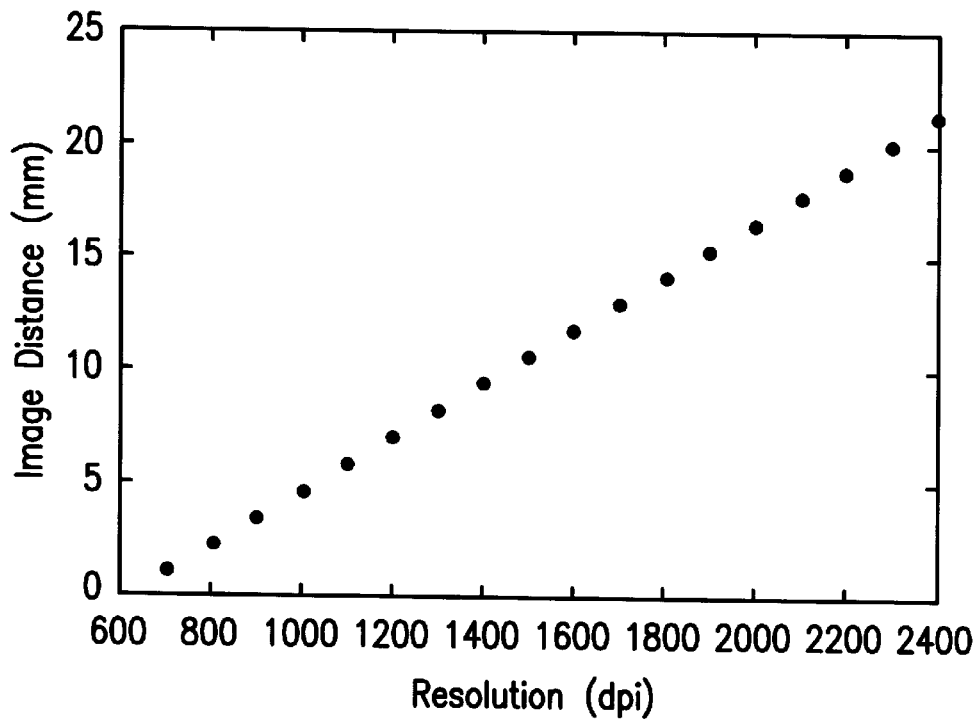
FIG. 4A illustrates the relationship between the resolution and object distance.
Figure 4B:
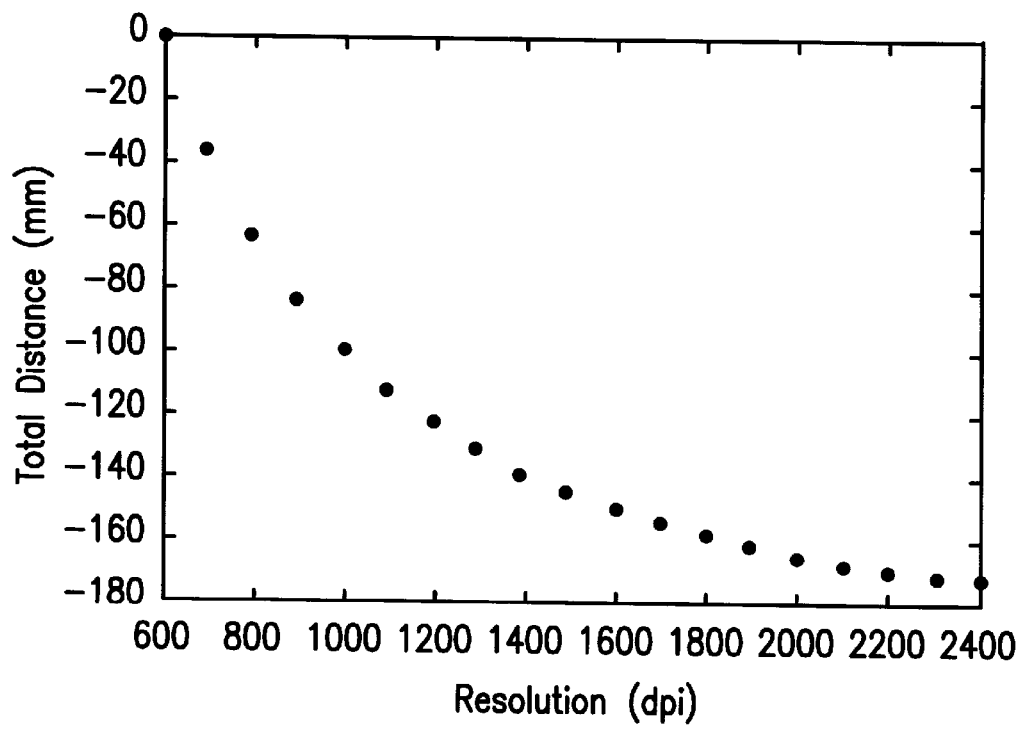
FIG. 4B illustrates the relationship between the resolution and total distance.
Figure 4C:
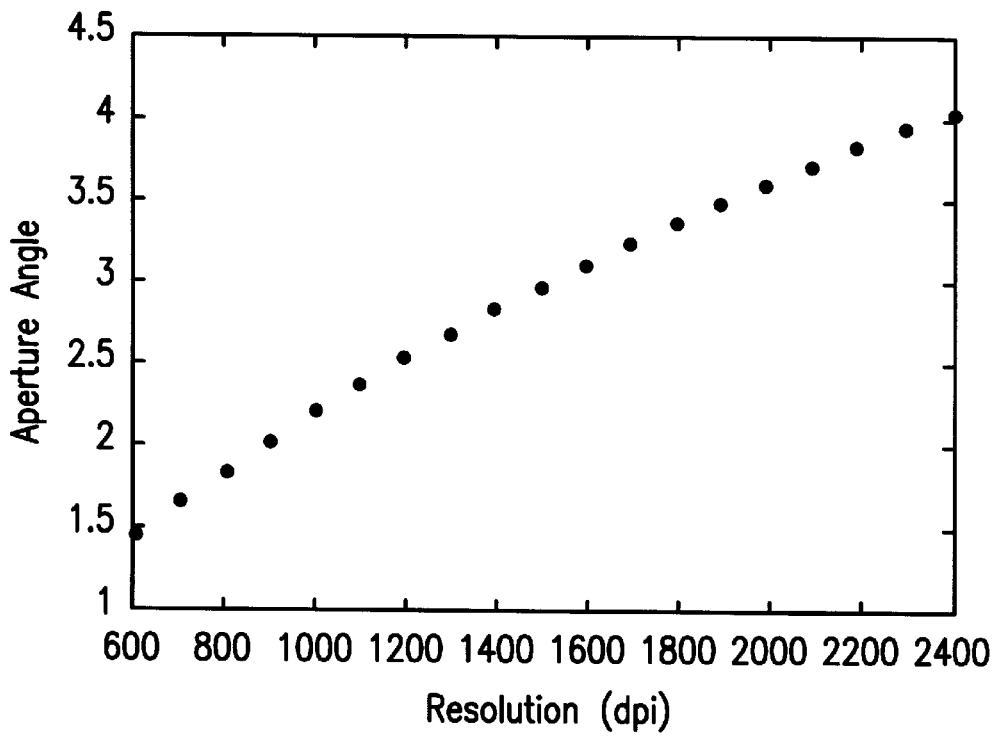
FIG. 4C illustrates the relationship between the resolution and aperture angle.
Figure 4D:
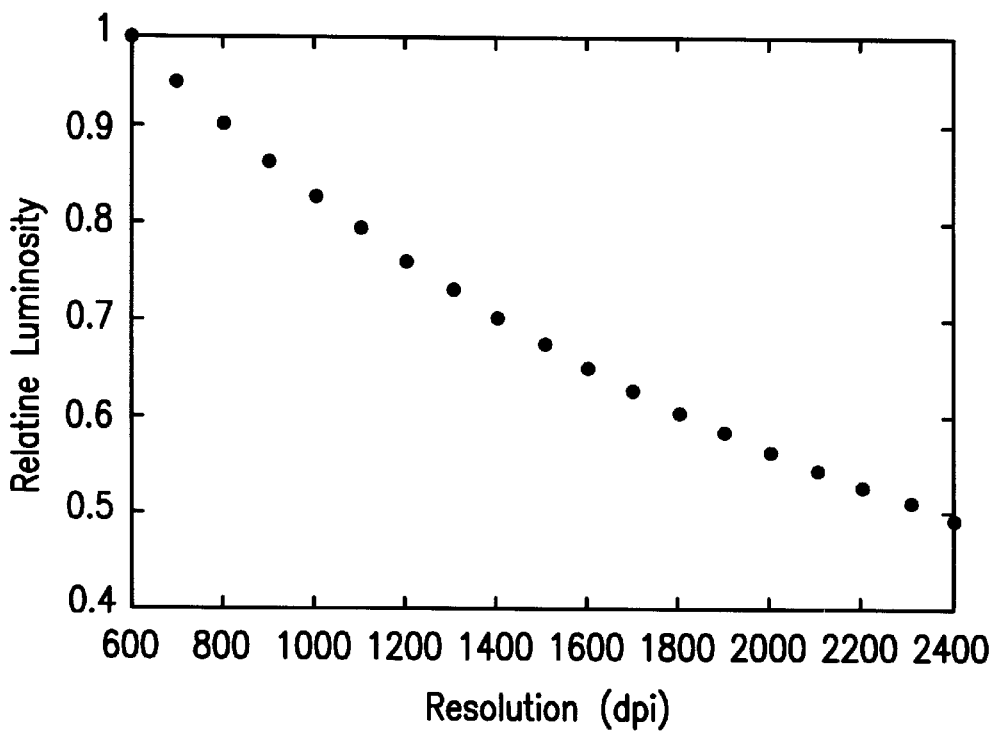
FIG. 4D illustrates the relationship between the resolution and relative luminosity.

For more detailed data, refer to FIGS. 4A through 4D. FIG. 4A illustrates the relationship between the resolution and image distance; FIG. 4B illustrates the relationship between the resolution and total distance; FIG. 4C illustrates the relationship between the resolution and aperture angle; and FIG. 4D illustrates the relationship between the resolution and relative luminosity. Referring to FIG. 4A, the resolution is proportional to image distance. FIG. 4B shows that the shorter the total distance is, the higher the resolution will be. FIG. 4C shows the positive correlation between the resolution and the aperture angle. Referring to FIG. 4D, higher resolution results in lower relative luminosity. However, even though the resolution has increased to 2400 dpi from 600 dpi, a relative luminosity of about 50% can still be achieved. That is, the relative luminosity is still high enough for the normal operation of the image detector to be possible.

What is claimed is:

1. A magnification-variation scanner, comprising
a light source, providing light for scanning an object surface;
an object lens for forming an image with rays reflected from the object surface;
an image detector, for receiving the image projected thereon from the object lens;
a holder for carrying the object lens between a third position and forth position; and
an optical path delay, which can be moved between a first position and a second position, wherein when the optical path delay is located at the first position, the optical path delay is located at the light path from the light source to the object lens, to modify the optical path between the object surface and the object lens, and the object lens is located at the third position to make the image focused on the image detector;
wherein when the optical path delay is located at the second position, the optical path delay is away from the light path from the light source to the object lens, with no effect to modify the optical path between the object surface and the object lens, and the object lens is located at the fourth position to make the image focused on the image detector, thereby changing the dimensions of the image projected over the image detector.

2. The magnification-variation scanner as claimed in claim 1 further comprising a driver, connecting the holder and the optical path delay, and used to control the movements of the holder and the optical path delay, thereby changing the optical path from the object surface to the object lens and that from the object lens to the image detector according to the equations of $$l' = f'(1 - M),$$
$$l = f'\left(1 - \frac{1}{M}\right)$$
and
$$T = l + l' = f'\left(2 - \frac{1}{M} - M\right),$$

wherein T is total distance from the object surface to the image detector, l is optical path from the object surface to the object lens, l' is optical path from the object lens to the image detector, f' is focal distance and M is the magnification.

3. The magnification-variation scanner as claimed in claim 2, wherein the driver controls movements of the optical path delay and the holder according to the equations of $$dl' = -f' dM,$$
$$dl = f'\frac{dM}{M^2}$$
and
$$dT = -f'\left(1 - \frac{1}{M^2}\right) dM,$$

wherein dT is a small variation in total distance from the object surface to the image detector, dl is a small variation in the optical path from the object surface to the object lens, dl' is a small variation in the optical path from the object lens to the image detector, f' is focal distance and M is the magnification.

4. The magnification-variation scanner as claimed in claim 1 further comprising a plain lens for changing the orientation of the light path.

5. The magnification-variation scanner as claimed in claim 1, wherein the optical path delay is a set of plain lens.

6. The magnification-variation scanner as claimed in claim 1, wherein the optical path delay includes three reflective lens.

* * * * *